Figure 1:
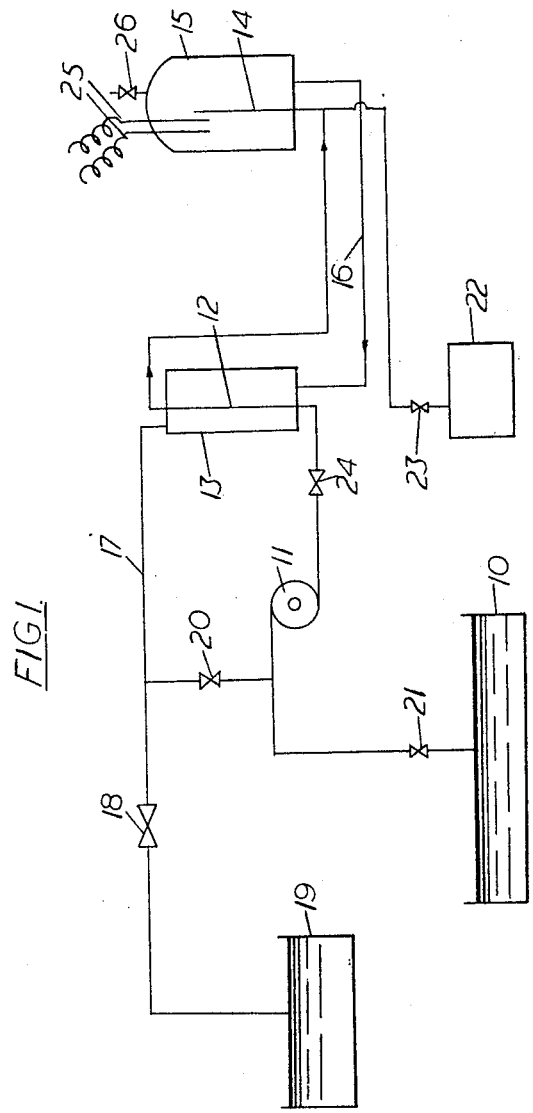

Nov. 3, 1964  I. K. PORTEOUS  3,155,611
APPARATUS FOR TREATMENT OF SEWAGE AND LIKE SLUDGES
Filed June 22, 1961  2 Sheets-Sheet 1

Inventor
Ian King Porteous
By.
Stevens Davis Miller & Mosher
Attorneys

Nov. 3, 1964  I. K. PORTEOUS  3,155,611
APPARATUS FOR TREATMENT OF SEWAGE AND LIKE SLUDGES
Filed June 22, 1961  2 Sheets-Sheet 2

Inventor
Ian King Porteous

By Stevens Davis Miller & Mosher
Attorneys 3,155,611
APPARATUS FOR TREATMENT OF SEWAGE
AND LIKE SLUDGES
Ian King Porteous, Mappleborough Green, Studley, England, assignor to Norstel and Templewood Hawksley Limited, Slough, England
Filed June 22, 1961, Ser. No. 118,810
2 Claims. (Cl. 210—86)

This invention relates to the treatment of sewage sludge and similar organic materials. In the course of such treatment the raw sludge is normally fed through a heat-exchanger and after further heating is subjected to a prolonged conditioning treatment at a high temperature. After conditioning the sludge is fed back through the heat-exchanger to transfer heat to the incoming sludge and is then passed to settlement vessels, after which it is commonly made into cake in filter presses or vacuum filters.

In the commonest form of such process the conditioning of the heated sludge is carried out in a number of vessels operated in sequence so that in effect it is the equivalent of a batch process. It is the object of the present invention to modify a process of this general character in such manner that the process is adapted for continuous operation and at the same time is simplified as compared with similar processes hitherto used.

The present invention is a process for the treatment of raw organic sludge, such as sewage sludge, which includes the steps of supplying sludge continuously to a preheating stage, positively preventing reverse flow of said sludge, passing said sludge substantially vertically through said preheating stage, thoroughly admixing the preheated sludge with steam, continuously passing the mixture of sludge and steam in a substantially vertical direction through a closed reaction vessel, continuously regulating the rate of passage of said mixture through said reaction vessel in order to condition the sludge to the required degree and to maintain in said reaction vessel a substantially constant level which leaves space for gas given off during conditioning of said sludge, venting said gas from said reaction vessel, and continuously drawing off the conditioned sludge from said reaction vessel.

Preferably, particularly at the commencement of the process, the sludge is recirculated for any desired period of time through the preheating stage and the reaction vessel, whereafter raw sludge is continuously introduced into the preheating stage of the circuit and continuous treatment then becomes effective and sludge from the reaction vessel is continuously directed to settling tanks or the like.

The present invention is also apparatus for the treatment of raw organic sludge, such as raw sewage sludge, comprising the combination of a sludge supply vessel, preheating means, a reaction vessel, first pipe means communicating between said sludge supply vessel and said reaction vessel and passing substantially vertically through said preheating means intermediate said vessels, a feed pump interposed in said first pipe means between said sludge supply vessel and said preheating means, a non-return valve in said first pipe means between said feed pump and said preheating means to positively prevent reverse flow of sludge in said first pipe means, a steam boiler, second pipe means communicating between said boiler and said first pipe means adjacent said reaction vessel, means for thoroughly admixing the sludge and the steam, means for directing the mixture of preheated sludge and steam through said reaction vessel in a substantially vertical direction, means for regulating the rate of passage of said mixture through said reaction vessel in order to condition the sludge and to maintain in said reaction vessel a substantially constant level which leaves space for gas given off during conditioning of said sludge, means for venting said gas from said reaction vessel, and means for continuously discharging the conditioned sludge from said reaction vessel. The conditioned sludge leaving the reaction vessel is passed in continuous flow to a settlement vessel, preferably through a heat exchanger where it preheats the raw sludge. During normal operation of conditioning in the reaction vessel there will be a steady vertical movement of sludge and by the time it reaches the outlet conditioning is complete. In this way the process is rendered truly continuous and operation is considerably simplified.

The sludge requires to be pumped around the plant under pressure and this pressure may be considerably increased by the generation of gas in the reaction vessel. It is for this reason that the non-return valve in the supply part of the circuit is necessary since in its absence any increase in gas pressure might either stop the flow of sludge altogether or even cause a reversal of flow and possibly gas locks in the heat-exchanger. The venting of gas from the space above the sludge in the reaction vessel prevents any excessive pressures being reached. Preferably the inlet to the reaction vessel is close to the top and the outlet is at the bottom so that the flow is in the opposite direction to any flow which might naturally be induced by thermal effects. In this way the risk of by-passing which might otherwise arise from accelerated movement of localised volumes of sludge is overcome.

Alternatively the inlet may also be at the bottom of the vessel. In either case it is advisable for a system of baffles or diffuse boxes to be utilised to minimise the risk of by-passing.

In order that the invention may be more readily understood a more precise description thereof will now be given, by way of example, with the aid of the accompanying drawings, in which:

FIGURE 1 shows schematically, in the form of a flow sheet, a preferred system by which the invention is achieved; and FIGURES 2 to 6 represent, respectively, and in diagrammatic form, five alternative forms of reaction vessel.

Like numerals represent like parts in the several figures of the drawings.

Referring to FIGURE 1, sludge from a supply represented by container 10 is pumped by pump 11 to the inlet of one element 12 of a heat-exchanger 13. The outlet from 12 is connected to a vertically arranged pipe 14 disposed within a treatment or reaction vessel 15 which will be described in greater detail hereinafter with reference to FIGURES 2 to 6.

An outlet pipe 16 from the treatment or reaction vessel is taken to the inlet of the second element of the heat-exchanger, the outlet pipe of which is indicated at 17. The latter passes via a control valve 18 to a settlement tank or the like 19; or, alternatively, it may be taken, via valve 20, to the inlet of pump 11. A further control valve 21 is provided in the supply pipe from the container 10 to pump 11 so that the pump can be selectively supplied either from pipe 17 or from container 10.

Steam from a boiler 22 is supplied, as required, via control valve 23 to the inlet of the reaction vessel 15. Valve 24 is a non-return valve in the sludge supply line from the pump to the heat-exchanger 13.

When the plant is first started up some time is necessary before the sludge reaches its conditioning temperature and there is a danger that some of the sludge may not be fully conditioned. To overcome this danger it is desirable that the feed pump should be of the variable speed type and also that provision be made for recirculating. For this purpose valve 18 is closed and valves 20, 21 and 23 are open until the system is filled to the required extent, after which valve 21 is closed and recirculating commences. The sludge may be passed through the plant two or more times until the full operating temperature is reached. When the operating temperature is reached, valve 20 in the recirculating connection is closed and valves 18 and 21 are opened so that the sludge passes out through the valve 18 in the normal way.

The heat-exchanger is conveniently of the concentric type connected so that the hot sludge passes through a central pipe surrounded by an outer pipe of greater diameter carrying the colder sludge as diagrammatically indicated in FIGURE 1. If required, the outer pipe carrying the colder sludge may be surrounded by a jacket carrying the hot exhaust gas from the heating unit so as to assist in the heating of the cold sludge in the heat-exchanger.

After the sludge has been passed back through the heat-exchanger its pressure must be reduced by means of the throttling valve 18 before it is passed to the settlement vessel or vessels 19. The setting of this valve controls the rate of flow from the reaction vessel 15 and in order to keep the level of sludge in the vessel substantially constant the rate of flow from the vessel must be adjusted to be equal to the rate of flow into the vessel. For this purpose electrical flow gauges (not shown) may be connected just before the throttle valve 18 and just after the inlet to the plant as a whole. It is then necessary to adjust the throttle valves 18 and 21 until the flow at these two points is equal. By a suitable differential connection of the outputs from the two gauges these may be caused to operate the throttle valves automatically if required. In a modified arrangement, a device utilizing a pair of electrically-operated probes or float switches is located within the reaction vessel 15 and is so arranged that the throttle valve 18 is electrically energised to control the degree of opening or closing thereof in accordance with the level of sludge in the vessel 15, thus to maintain a substantially constant level in the vessel.

Even with such an arrangement, however, it is desirable that some indication should be provided of the level of sludge within the reaction vessel and for this purpose a second pair of electric probes indicated at 25 may extend downwardly from the upper surface of the vessel. These may be adjusted with a differential between them so that an indication is given as soon as the level either rises or falls by a predetermined amount. If the level is automatically controlled, an indication would normally be obtained from the second system of probes only in the event of some failure in the plant, and these probes may thus be connected to operate an alarm system which would also automatically stop the operating of the plant. In addition to the automatic control of level in the reaction vessel a gas relief valve 26 may also be operated automatically as soon as a predetermined pressure is attained, or alternatively it may be operated periodically under manual control.

Figure 2:
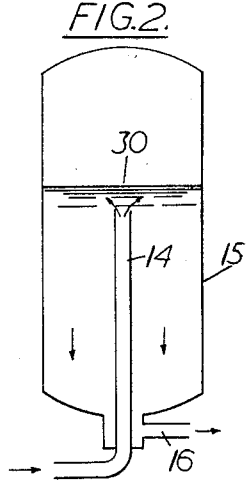

As shown in FIGURE 2 a mixture of sludge and steam is admitted at the base of the vessel and this is thoroughly admixed in a jet device which is not shown in the diagram. The mixture of sludge and steam rises up the central tube which terminates just below top water level 30 and the hot slurry then lies in a layer at the top of the mass of slurry. As this layer of slurry is replaced by subsequent layers, it will finally be forced out at the bottom of the vessel through pipe 16 having taken the required time to do so.

Figure 3:
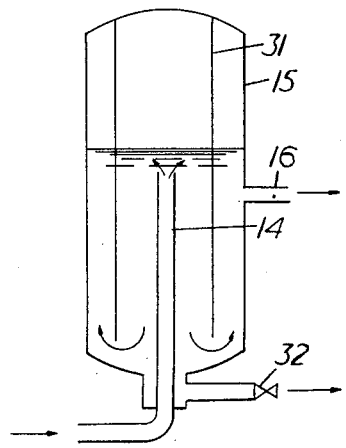

The form shown in FIGURE 3 is similar in that the mixture of sludge and steam is admitted at the base of the vessel, but in this case an annular skirt 31 is fitted inside the vessel itself, forming in effect a second vessel, but with no base. As before, the sludge and steam mixture spills over the top of the central tube 14; in this case, however, it is forced down underneath the base of the skirt and rises up again and is discharged near top water level. In this case, moreover, a sump is provided at the base of the vessel with a suitable valve 32 so that the vessel can be blown down, as necessary, to clear any sedimentation.

Figure 4:
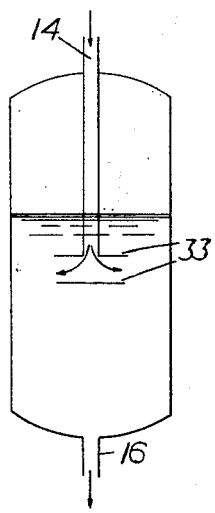

With the construction shown in FIGURE 4 the mixture of sludge and steam is admitted at the top of the vessel and is deflected at the end of the entry tube by means of a baffle 33 which disperses the liquor in the horizontal layer. As before, layering of the liquid will take place and when the necessary time has elapsed, the treated sludge will be evacuated from the base of the vessel.

Figure 5:
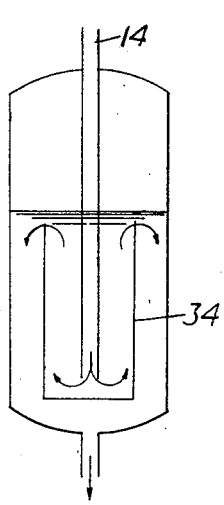

The form shown in FIGURE 5 is similar to that according to FIGURE 4 but what is in effect, a second vessel 34 is provided inside the main pressure shell and the open top of this second vessel is just below top water level and the direction of the flow is self evident.

Figure 6:
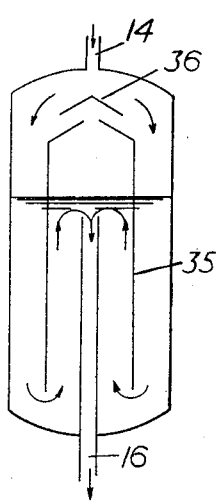

In FIGURE 6 the mixture of the sludge and steam is shown as admitted at the top of the vessel and drawn off by means of the central tube 16 from the bottom of the vessel. A form of secondary vessel 35 is also utilised, but in this case, provision has been made for the liquor to pass through the annular space first, then to rise up inside the secondary vessel before being evacuated through the central tube. It will be noted that a conical baffle 36 is provided inside the top of the vessel to deflect the flow in the required direction.

I claim:

1. Apparatus for the treatment of raw organic sludge, such as raw sewage sludge, comprising the combination of a sludge supply vessel, a heat exchanger, a reaction vessel, first pipe means communicating between said sludge supply vessel and said reaction vessel and passing substantially vertically through said heat exchanger intermediate said vessels, a variable-speed feed pump interposed in said first pipe means between said sludge supply vessel and said heat exchanger, a non-return valve in said first pipe means between said feed pump and said reaction vessel to positively prevent reverse flow of sludge in said first pipe means, a steam boiler, second pipe means communicating between said boiler and said first pipe means adjacent said reaction vessel, means for directing the mixture of preheated sludge and steam through said reaction vessel in a substantially vertical direction, means for regulating the rate of passage of said mixture through said reaction vessel in order at least partly to condition the heated sludge and to maintain in said reaction vessel a substantially constant level which leaves space for gas given off during conditioning of said sludge, means for venting said gas from said reaction vessel, a settlement tank, third pipe means communicating between said reaction vessel and said settlement tank, means for continuously discharging the heated sludge from said reaction vessel through said third pipe means, said third pipe means passing through said heat exchanger in order that heated sludge leaving said reaction vessel is adapted to give up heat to sludge passing through said heat exchanger in said first pipe means, a branch pipe communicating between said first pipe means at the inlet side of said pump and said third pipe means, a first valve in said third pipe means on the settlement tank side of said branch pipe, a second valve in said branch pipe, and a third valve in said first pipe means on the supply vessel side of said branch pipe, said first, second and third valves being adapted when closed to shut off flow through the respective pipes whereby, on starting up the apparatus sludge can be recirculated until it is fully conditioned by closing said first and third valves and opening said second valve.

2. Apparatus for the treatment of raw organic sludge such as raw sewage sludge, comprising the combination of a sludge supply vessel, a heat exchanger, a reaction vessel, first pipe means communicating between said sludge supply vessel and said reaction vessel and passing substantially vertically through said heat exchanger intermediate said vessels, a variable-speed feed pump interposed in said first pipe means between said sludge supply vessel and said heat exchanger, a non-return valve in said first pipe means between said feed pump and said reaction vessel to positively prevent reverse flow of sludge in said first pipe means, a steam boiler, second pipe means communicating between said boiler and said first pipe means adjacent said reaction vessel, means for directing the mixture of preheated sludge and steam through said reaction vessel in a substantially vertical direction, means for regulating the rate of passage of said mixture through said reaction vessel in order at least partly to condition the heated sludge and to maintain in said reaction vessel a substantially constant level which leaves space for gas given off during conditioning of said sludge, means for indicating the level in said reaction vessel, means for venting said gas from said reaction vessel, a settlement tank, third pipe means communicating between said reaction vessel and said settlement tank, means for continuously discharging the conditioned sludge from said reaction vessel through said third pipe means, said third pipe means passing through said heat exchanger and thereat being concentrically surrounded by said first pipe means in order that hot sludge in said third pipe means gives up heat to sludge passing through said heat exchanger in said first pipe means, a branch pipe communicating between said first pipe means at the inlet side of said pump and said third pipe means, a first valve in said third pipe means on the settlement tank side of said branch pipe, a second valve in said branch pipe, and a third valve in said first pipe means on the supply vessel side of said branch pipe, said first, second and third valves being adapted when closed to shut off flow through the respective pipes whereby, on starting up of the apparatus, sludge can be recirculated until full conditioning temperature thereof is reached by closing said first and third valves and opening said second valve, and when said full conditioning temperature is reached continuous treatment of sludge can be achieved by opening said first and third valves and closing said second valve.

References Cited in the file of this patent

UNITED STATES PATENTS

| | | |
|---|---|---|
| 2,075,224 | Porteous | Mar. 30, 1937 |
| 2,131,711 | Porteous | Sept. 27, 1938 |
| 2,190,598 | Fischer | Feb. 13, 1940 |
| 2,201,056 | Seligman | May 14, 1940 |

FOREIGN PATENTS

| | | |
|---|---|---|
| 653,984 | Great Britain | May 30, 1951 |

OTHER REFERENCES

"Sludge Heating Methods," Greene, Sewage Works J., November 1949, vol. 21, pp. 968–973.